United States Patent [19]
Chiu

[11] Patent Number: 6,061,800
[45] Date of Patent: May 9, 2000

[54] COMPUTER WIRELESS RECEIVER POWERED BY RS232 SIGNALS OF A SERIAL PORT

[76] Inventor: Hung-Che Chiu, No. 3, 4th Fl., Lane 28, Sec. 2, Hsin Sheng N. Rd., Taipei, Taiwan

[21] Appl. No.: 08/914,178

[22] Filed: Aug. 19, 1997

[51] Int. Cl.[7] .................................................. G06F 1/26
[52] U.S. Cl. ............................................................ 713/300
[58] Field of Search ...................................... 395/308, 309, 395/750.01; 340/538; 364/551.01; 375/333, 60; 710/129; 713/300

[56] References Cited

U.S. PATENT DOCUMENTS

| | | | |
|---|---|---|---|
| H610 | 3/1989 | Focarile et al. | 379/60 |
| 4,453,257 | 6/1984 | Lo et al. | 375/60 |
| 4,901,217 | 2/1990 | Wilson | 363/126 |
| 4,996,453 | 2/1991 | Zanders et al. | 307/475 |
| 5,047,663 | 9/1991 | Lee et al. | 307/296.1 |
| 5,438,678 | 8/1995 | Smith | 710/300 |
| 5,587,824 | 12/1996 | Asprey | 359/154 |
| 5,757,672 | 5/1998 | Hoepken | 364/551.01 |
| 5,812,802 | 9/1998 | Bahout et al. | 395/308 |

*Primary Examiner*—Xuan M. Thai
*Attorney, Agent, or Firm*—Rosenberg, Klein & Lee

[57] ABSTRACT

A computer wireless receiver comprising a power source regulating device, a converting device, a decoder, a microprocessor, a memory and other devices for connecting to the COM PORT of a general computer or a portable computer, to receive and transfer data. The power source regulating device is used for rectifying, filtering and regulating the DSR and RTS RS232 signals as the power source of a system. The converting device is used for converting the received signal to signal levels of 0 V or 3 V, the transferred signal is converted to +4 V or −4 V signal levels. Thus, the receiver will not require the addition of another external power source.

1 Claim, 3 Drawing Sheets

COMPUTER WIRELESS RECEIVER POWERED BY RS232 SIGNALS OF A SERIAL PORT

BACKGROUND OF THE INVENTION

1. Field of the Invention

The present invention is related to a computer wireless receiver, especially, to a receiving device to be connected directly to the COM PORT of a computer without any external power source.

2. Prior Art

Since computer science has become more and more popular, computers are being used to process and operate with complicated data. News and economic messages may be transferred by a wireless communication sub-system and then displayed and stored in a computer. The wireless communication sub-system may be employed to transfer character messages and to remotely control a safety system. However, in general, the high frequency circuit of the wireless communication sub-system must have a better power source, and the signal on the carrier must be encoded and decoded so as to attain a better data transformation. Therefore, the peripheral devices for a computer will occupy a large volume. Thus, if it is used in a portable computer or a personal digital assistant (P.D.A.), apparently such is not an ideal device and also is not easy to carry and operate.

SUMMARY OF THE INVENTION

Accordingly, the object of the present invention is to provide a computer receiver comprising a power source regulating device, a converting device, a decoder, a microprocessor, a memory and other devices for connection with the COM PORT of a general purpose computer or a portable computer to receive and transfer data. The power source regulating device is used for rectifying, filtering and regulating the data set ready (DSR) and request to send (RTS) signals, as the power source for the system. The converting device is used for converting the received signal to the signal levels of 0 V or 3 V. The transferred signal is converted to the +4 V or −4 V signal levels, and the transferred signal is converted to the +4 V or −4 V of RS232 levels. Thus, the receiver will not require the addition of another external power source.

The present invention will be better understood and its numerous objects and advantages will become apparent to those skilled in the art by referencing to the following drawings in which:

DESCRIPTION OF THE PREFERRED EMBODIMENT

Figure 1:
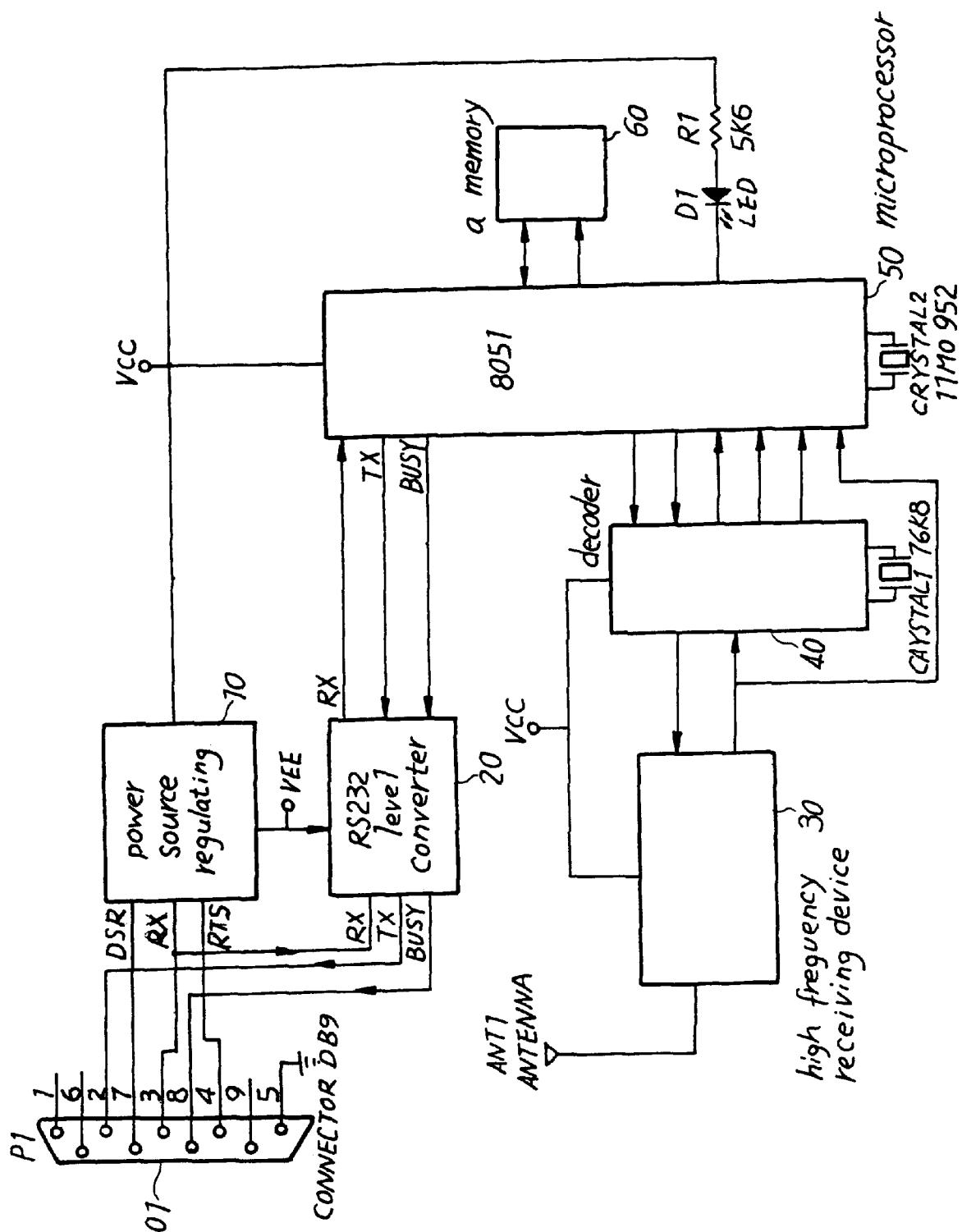
FIG. 1 is a block diagram of the circuit of the present invention.

Now referring to FIG. 1, the present invention comprises a power source regulating device 10, a converter 20, a high frequency receiving device 30, a decoder 40, a microprocessor 50, and a memory 60. The power source regulating device 10 is installed with a connector 101 for connecting with the COM PORT of a computer for rectifying, filtering and regulating the data-set-ready (DSR) and request-to-send (RTS) signals as a system power source.

After a wireless signal is received by the high frequency receiving device 30, it is then compared and decoded by a decoder 40, for decoding address codes and message codes. Next, the received signal is transferred to the microprocessor 50 for operating on the received signal. The memory 60, connected to the microprocessor 50, is employed for storing the sequential numbers, speeds, address codes and other system messages. The signal operated on by the microprocessor 50 is transferred to a converter 20 so that the receiving (RX), transferring (TX) and busy signals will be converted to 0 V, 3 V, 4 V and −4 V signals of RS232 levels. Thus, the connector 101 connects to the COM PORT of a computer so that the data may be input into the computer. Therefore, the wireless communication sub-system will receive and transfer data without any external power source.

Figure 2:
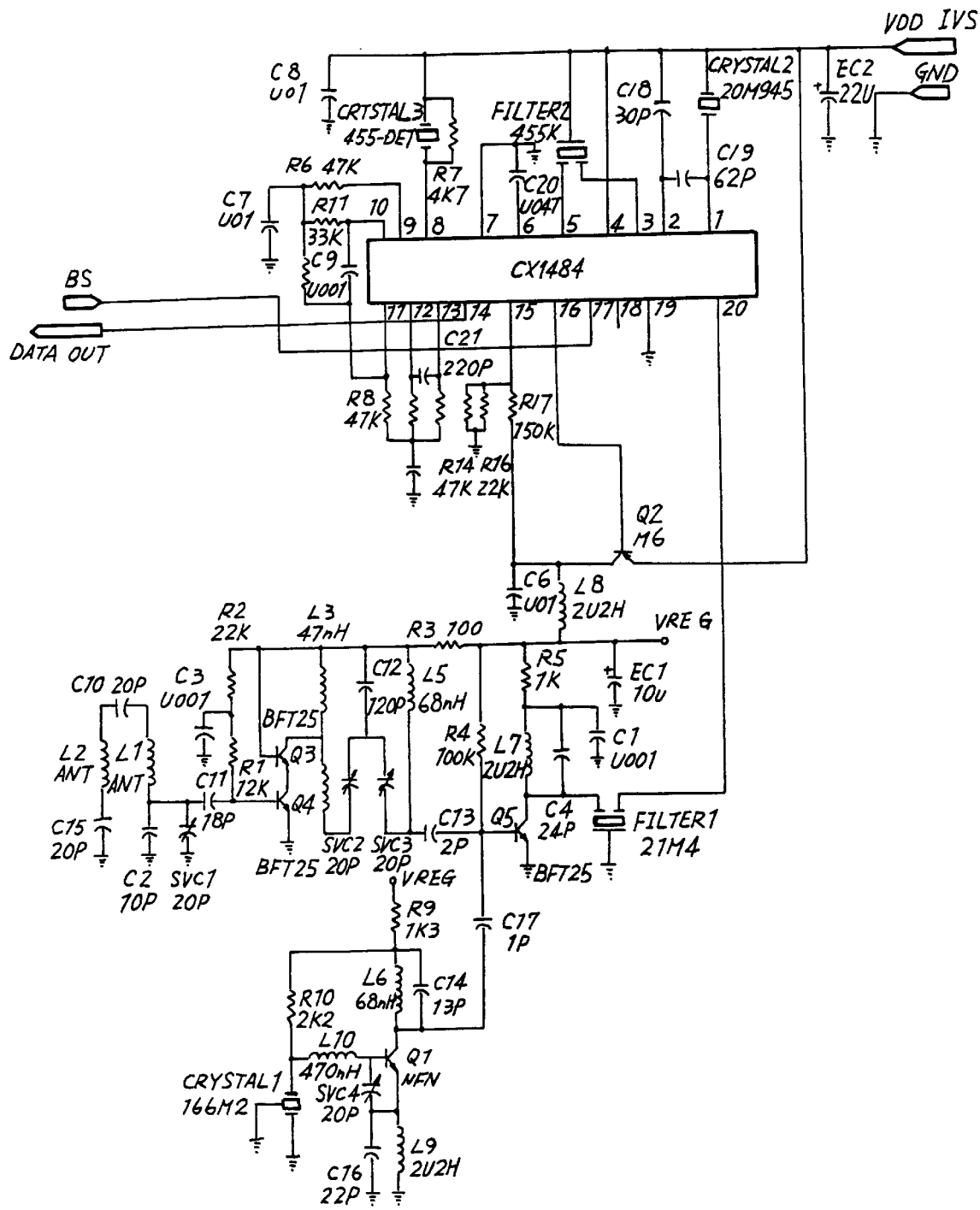
FIG. 2 is a diagram of the high frequency circuit of the present invention; and, FIG. 3 is a circuit diagram of the receiving and power source parts of the present invention.

Now referring to FIG. 2, a part of the high frequency circuit of the present invention is shown, as shown in the Figure, an antenna (ANT) receives a high frequency signal, and the signal is amplified by a high frequency amplifier which is formed by Q3 and Q4, and then is further output to a filter formed by Q1 and other peripheral elements associated therewith. Thus, the frequency thereof is reduced to an intermediate frequency of 21.4 MHZ, and then it is transferred to an intermediate frequency IC (CXA1484) for conversion to an intermediate signal of 455 KHz. Finally, it is detected and shaped to generate a non-return-to-zero (NRZ) digital signal.

Figure 3:
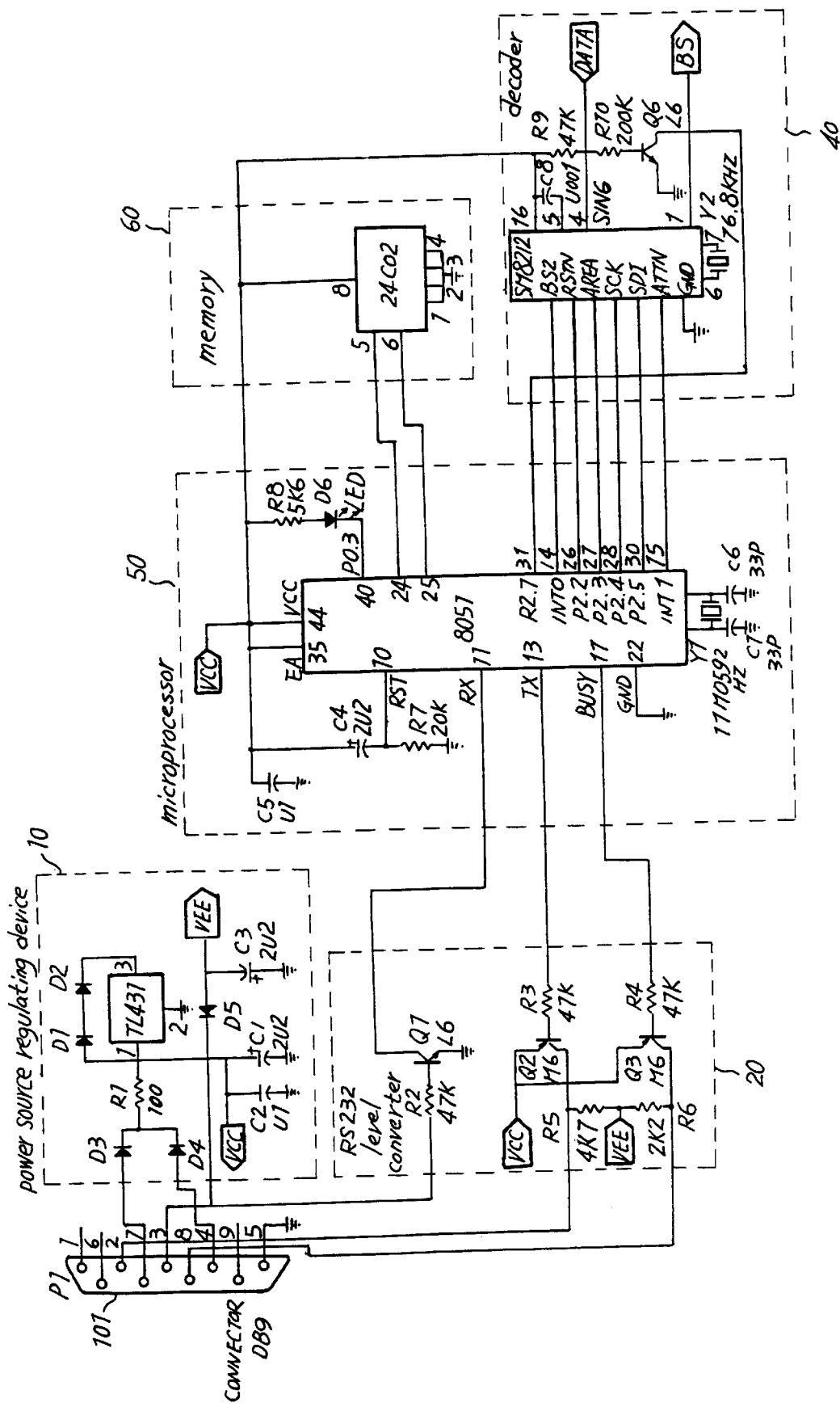

Now referring to FIG. 3, after said NRZ signal has been transferred to a decoder, the decoder will decode an address code and a message code. Then, the decoded data will be further transferred to a microprocessor (8051). After being processed by the microprocessor, the data is transferred to a converting device by the receiving, transferring and BUSY functions.

The converting device comprises a first, a second and a third transistor. The first transistor Q1 is used to receive a signal and then convert the signal to 0 V or 3 V levels. The second transistor Q2 is used to transfer a signal and then convert said signal to +4 V or −4 V of RS232 levels, so that it is transferred to a connector with those levels, for further being connected to the COM PORT of a computer.

In the power source regulating device, connected to the connector, the voltages of the DSR and RTS signals are rectified by diodes D3 and D4 and filtered by D5, C1 and C3. Finally, the rectified signals are regulated by a regulating IC (TLA31). A steady working voltage is thereby obtained to form the power source of the system. The whole receiving condition and the supply of power from the RS232 COM PORT may be clearly displayed on the light emitting diode (D6).

In the present invention, the power is supplied from an RS232 port without any other power source, and the frequency thereof may be selected within the ranges from 150 MHZ to 170 MHZ or from 270 MHZ to 290 MHz. Meanwhile, the present invention may process a set of control codes and many sets of ID codes, wherein, the function of the control codes are used to change the ID codes of a plurality of receivers, or to set the on/off operation in any ID code, or to cut off any operation of the receivers and to correct the time or date within the plurality of receivers, synchronously. While as required, the plurality of ID codes may be employed to receive different information, and the transferred messages may be encrypted.

In summary, the power regulating and converting device of the present invention will cause the receiver of a computer to directly use the power from an RS232 COM PORT, without any other external power source. Thus, the device will be more compact and portable.

Although a preferred embodiment of the present invention has been shown and described in detail, it should be understood that various changes and modification may be made therein without departing from the scope of the appended claims.

What is claimed is:

1. A wireless computer receiver for coupling to a serial port of a computer, comprising:

a power source regulating device for rectifying, filtering and regulating predetermined signals from the serial port of the computer as a source of power, said power source regulating device has an input respectively coupled to said predetermined signals from the serial port through respective diodes, said predetermined signals being a data set ready signal and a request to send signal;

a high frequency receiving device powered by said power source regulating device and having an antenna for receiving coded signals;

a decoder powered by said power source regulating device and coupled to said high frequency receiving device for decoding signals output from said high frequency receiving device, said decoder decoding an address code and a message code;

a microprocessor powered by said power source regulating device and coupled to said decoder for transferring the decoded signals;

a converting device powered by said power source regulating device and coupled to the serial port and said microprocessor for converting the transferred decoded signals to RS232 levels; and a memory powered by said power source regulating device for storing sequential numbers, speeds, said address codes and other systematic data.

* * * * *